(12) United States Patent
Matsuda et al.

(10) Patent No.: US 7,457,084 B2
(45) Date of Patent: Nov. 25, 2008

(54) RECORDING MEDIUM DRIVE WITH MAGNETIC BODY EMBEDDED IN HOUSING BASE OPPOSITE VOICE COIL MOTOR TO SUPPRESS LEAKAGE FLUX

(75) Inventors: Yoshiharu Matsuda, Kawasaki (JP);
Shinji Fujimoto, Kawasaki (JP);
Masato Shibuya, Kawasaki (JP);
Keiichi Miyajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 11/100,413

(22) Filed: Apr. 7, 2005

(65) Prior Publication Data

US 2005/0174698 A1   Aug. 11, 2005

Related U.S. Application Data

(63) Continuation of application No. PCT/JP03/04851, filed on Apr. 16, 2003.

(51) Int. Cl.
*G11B 5/55* (2006.01)
*G11B 19/20* (2006.01)
*G11B 21/02* (2006.01)
*G11B 25/04* (2006.01)
*G11B 33/12* (2006.01)
*G11B 33/14* (2006.01)

(52) U.S. Cl. ................... 360/264.7; 360/97.02
(58) Field of Classification Search ............... 360/264.7, 360/264.8, 264.9, 97.01, 97.02, 97.03, 128
See application file for complete search history.

(56) References Cited

U.S. PATENT DOCUMENTS

| 5,270,887 A | * | 12/1993 | Edwards et al. | 360/97.03 |
| 5,315,464 A | * | 5/1994 | Tsujino | 360/99.08 |
| 5,315,466 A | * | 5/1994 | Nishimoto et al. | 360/264.8 |
| 5,532,889 A | * | 7/1996 | Stefansky et al. | 360/97.01 |
| 5,585,981 A | * | 12/1996 | Lee | 360/264.7 |
| 5,600,510 A | * | 2/1997 | Shikano | 360/97.02 |
| 5,636,091 A | | 6/1997 | Asano | |
| 6,125,016 A | | 9/2000 | Lin | |
| 6,304,421 B1 | * | 10/2001 | Brown | 360/264.8 |
| 6,603,632 B1 | * | 8/2003 | Lee | 360/97.02 |
| 6,914,755 B2 | | 7/2005 | Yanagihara | 360/264.8 |
| 2002/0063998 A1 | * | 5/2002 | Kazmierczak et al. | 360/264.9 |
| 2002/0191346 A1 | * | 12/2002 | Oki et al. | 360/264.7 |
| 2003/0011926 A1 | * | 1/2003 | Watanabe et al. | 360/97.01 |

FOREIGN PATENT DOCUMENTS

JP   4-301272    10/1992
JP   10-506213   6/1998

* cited by examiner

*Primary Examiner*—Craig A Renner
(74) *Attorney, Agent, or Firm*—Kratz, Quintos & Hanson, LLP

(57) ABSTRACT

A hard disk drive includes a base having a bottom plate. A magnetic body is embedded in the bottom plate. The magnetic body is allowed to serve as a magnetic shield in the hard disk drive. The magnetic body is allowed to have a sufficient thickness without requiring an additional space outside the base, since the magnetic body is embedded in the base. The magnetic field directed outside the base can reliably be absorbed at the magnetic body. The magnetic body may be received in a depression defined in the bottom plate. The depression may be formed based on a reduction in the thickness of the bottom plate.

6 Claims, 5 Drawing Sheets

RECORDING MEDIUM DRIVE WITH MAGNETIC BODY EMBEDDED IN HOUSING BASE OPPOSITE VOICE COIL MOTOR TO SUPPRESS LEAKAGE FLUX

This application is a continuation of international application PCT/JP03/04851 filed Apr. 16, 2003.

BACKGROUND OF THE INVENTION

1. Field of the Invention

The present invention relates to a housing base utilized in a recording medium drive such as a hard disk drive, HDD, for example.

2. Description of the Prior Art

An actuator arm is incorporated within a hard disk drive so as to support a head slider at the tip end. A voice coil motor, VCM, is coupled to the actuator arm. The voice coil motor includes a pair of permanent magnets and a voice coil. The permanent magnets are fixed to a housing base of the hard disk drive. The voice coil motor is located in a space between the permanent magnets. The voice coil generates a magnetic flux in response to supply of electric current. The generated magnetic flux interacts with the magnetic flux of the permanent magnets so as to induce the swinging movement of the actuator arm. The head slider is thus allowed to be positioned at a target recording track on a magnetic recording disk.

The intensity of the magnetic flux should be enhanced to improve the performance of the voice coil motor, for example. The magnetic flux may leak outside the housing base around the voice coil motor. The leakage of the magnetic flux is preferably prevented to the utmost. In particular, a printed circuit board is attached to the outside of the housing base in the hard disk drive. A controller circuit is established on the printed circuit board so as to control the operation of the hard disk drive. If a metallic piece or dust moves closer to the printed circuit board in response to application of the leaked magnetic flux, the metallic piece may cause a short on the printed circuit board.

SUMMARY OF THE INVENTION

It is accordingly an object of the present invention to provide a housing base capable of effectively suppressing leakage of a magnetic field.

According to a first aspect of the present invention, there is provided a recording medium drive comprising: a base having a bottom plate; a magnetic body embedded in the bottom plate; and a cover coupled to the base.

The magnetic body is allowed to serve as a magnetic shield in the recording medium drive. In addition, the magnetic body is allowed to have a sufficient thickness without requiring an additional space outside the base, since the magnetic body is embedded in the base. The magnetic field directed outside the base can reliably be absorbed at the magnetic body. The magnetic body may be received in a depression defined in the bottom plate. The depression may be formed based on a reduction in the thickness of the bottom plate.

The recording medium drive often comprises: an electric motor located in a space defined between the base and the cover; and a printed circuit board attached to the outside of the base. In this case, the magnetic body may be located in a space between the printed circuit board and the electric motor. The magnetic body serves as a magnetic shield for the electric motor. Even if the magnetic flux density is enhanced to improve the performance of the electric motor, the magnetic field directed outside the base can reliably be absorbed at the magnetic body. The magnetic body thus serves to suppress leakage of a magnetic field outside the base. The magnetic body may be located in a projection area defined on the surface of the bottom plate. The projection area may be contoured along the contour of the projection of the electric motor. Alternatively, the projection area may be contoured along the contour of the projection of a yoke incorporated in the electric motor. Otherwise, the projection area may be contoured along the contour of the projection of a magnet incorporated in the electric motor.

A specific housing base may be provided to realize the aforementioned recording medium drive. The housing base may comprise: a bottom plate; and a magnetic body embedded in the bottom plate. The magnetic body may be received in a depression defined in the bottom plate in the aforementioned manner. The depression may be formed based on a reduction in the thickness of the bottom plate.

The magnetic body may be located outside an imaginary circle described around a through hole for receiving a spindle motor. The imaginary circle is also designed to pass thorough a through hole for establishment of connection of a support shaft carrying an actuator arm. The magnetic body may be located at a position corresponding to the electric motor received on the surface of the bottom plate. The magnetic body may be located in a space between through holes for receiving screws employed to fix a yoke of the electric motor. The electric motor may be a voice coil motor. The base may be made of a non-magnetic material.

According to a second aspect of the present invention, there is provided a recording medium drive comprising: a base; a cover coupled to the base; an electric motor located in a space between the base and the cover, said electric motor having an outer surface received on the surface of the base; and a magnetic protrusion located on the outer surface of the electric motor, said magnetic protrusion protruding from the outer surface of the electric motor.

The magnetic protrusion is allowed to serve as a magnetic shield in the recording medium drive. Even if the magnetic flux density is enhanced to improve the performance of the electric motor, the magnetic field directed outside the base can reliably be absorbed at the magnetic protrusion. The magnetic protrusion thus serves to suppress leakage of a magnetic field outside the base.

The magnetic protrusion may integrally be formed on a yoke incorporated in the electric motor. The magnetic protrusion can be inserted in a groove of the base so as to position the electric motor on the base. Even if an impact is applied on the recording medium drive, the voice coil motor can be prevented from shifting along the surface of the base.

A specific yoke may be provided to realize the aforementioned recording medium drive. The yoke may comprise: an upper yoke; a lower yoke opposed to the upper yoke at a distance; and a magnetic protrusion located on the outer surface of the lower yoke, said magnetic protrusion protruding from the outer surface of the lower yoke. The magnetic protrusion may be integral to the lower yoke in the aforementioned manner.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
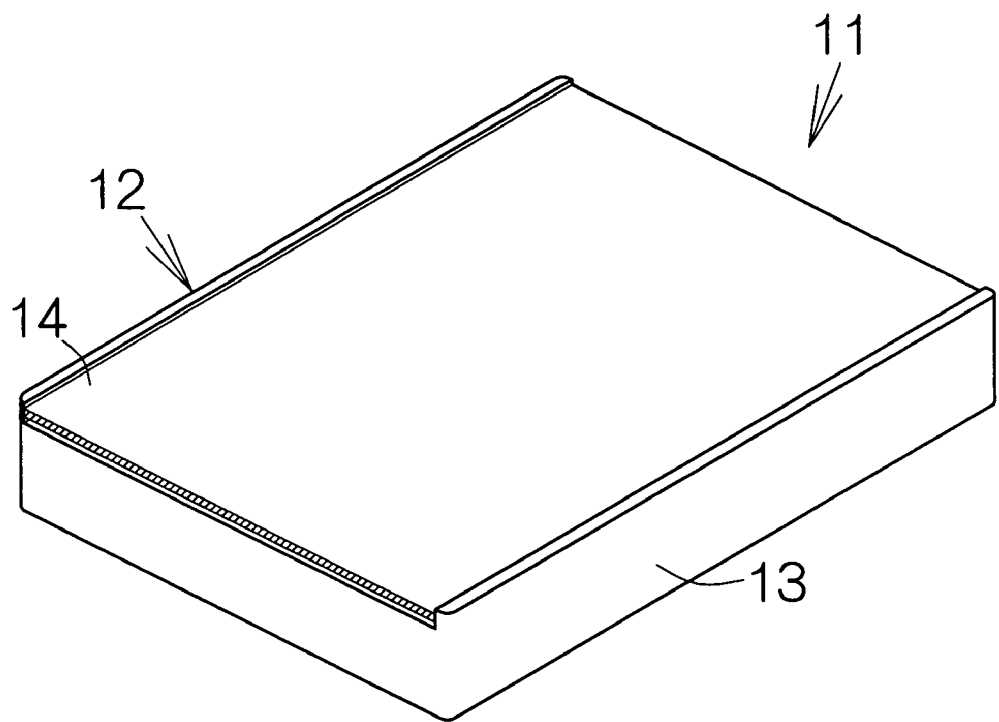
FIG. 1 is a perspective view schematically illustrating the outline of a hard disk drive (HDD) as a specific example of a recording medium drive according to a first embodiment of the present invention.

FIG. 1 schematically illustrates a hard disk drive, HDD, 11 as a specific example of a recording medium drive according to a first embodiment of the present invention. The hard disk drive 11 includes a box-shaped housing 12. The housing 12 includes a box-shaped main body or base 13 defining an inner space of a flat parallelepiped, for example. The base is made of a non-magnetic material. The base 13 may be made of a metallic material such as aluminum, for example. Molding process may be employed to form the base 13. A cover, not shown, is coupled to the base 13. The cover serves to close the inner space within the base 13 and the cover. Pressing process may be employed to form the cover out of a plate, for example. The plate may be a layered material, for example.

A printed circuit board 14 is attached to the outside of the base 13. LSI chips, not shown, such as a central processing unit (CPU), a hard disk controller, and the like, are mounted on the printed circuit board 14. The hard disk controller is designed to control the operation of the hard disk drive 11. The LSI chips are electrically connected to the printed circuit board through conductive pads arranged on the surface of the printed circuit board 14. A connector, not shown, is utilized to connect the printed circuit board 14 to a host computer.

Figure 2:
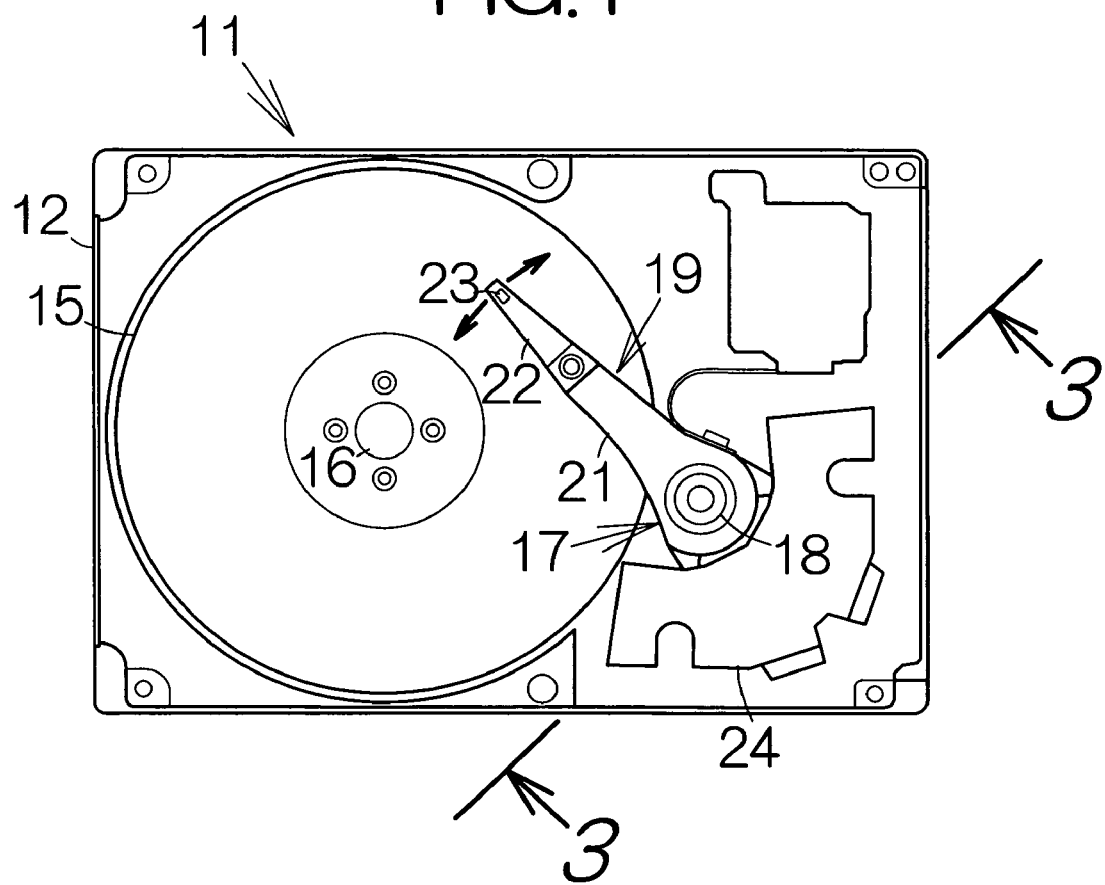
FIG. 2 is a plan view schematically illustrating the structure of the hard disk drive.

As shown in FIG. 2, at least one magnetic recording disk 15 as a recording medium is incorporated within the inner space of the base 13. The magnetic recording disk or disks 15 is mounted on the driving shaft of a spindle motor 16. The spindle motor 16 drives the magnetic recording disk or disks 15 at a higher revolution speed such as 7,200 rpm, 10,000 rpm, or the like.

A head actuator 17 is also incorporated within the inner space of the base 13. The head actuator includes an actuator block 19 supported on a vertical support shaft 18 for relative rotation. Rigid actuator arms 21 are defined in the actuator block 19. The actuator arms 21 are designed to extend in a horizontal direction from the vertical support shaft 18. The actuator arms 21 are associated with the front and back surfaces of the magnetic recording disk or disks 15, respectively.

The actuator block 19 may be made of aluminum, for example. Molding process may be employed to form the actuator block 19.

Elastic head suspensions 22 are fixed to the tip ends of the actuator arms 21. The individual head suspension 22 is designed to extend forward from the corresponding tip end of the actuator arm 21. As conventionally known, a flying head slider 23 is supported on the front end of the individual head suspension 22. The flying head sliders 23 are opposed to the surfaces of the magnetic recording disk or disks 15.

The head suspension 22 serves to urge the flying head slider 23 toward the surface of the magnetic recording disk 15. When the magnetic recording disk 15 rotates, the flying head slider 23 is allowed to receive airflow generated along the rotating magnetic recording disk 15. The airflow serves to generate a lift on the flying head slider 23. The flying head slider 23 is thus allowed to keep flying above the surface of the magnetic recording disk 15 during the rotation of the magnetic recording disk 15 at a higher stability established by the balance between the lift and the urging force of the head suspension 22.

An electric motor or voice coil motor, VCM, 24 is connected to the tail of the actuator block 19. The voice coil motor 24 drives the actuator block 19 for rotation around the support shaft 18. The rotation of the actuator block 19 induces the swinging movement of the actuator arms 21 and the head suspensions 22. When the actuator arm 21 is driven to swing about the support shaft 18 during the flight of the flying head slider 23, the flying head slider 23 is allowed to cross the recording tracks defined on the magnetic recording disk 15 in the radial direction of the magnetic recording disk 15. This radial movement serves to position the flying head slider 23 right above a target recording track on the magnetic recording disk 15. As conventionally known, in the case where two or more magnetic recording disks 15 are incorporated within the inner space of the housing 12, a pair of the elastic head suspensions 22 and the actuator arms 21 are disposed between the adjacent magnetic recording disks 15.

Figure 3:
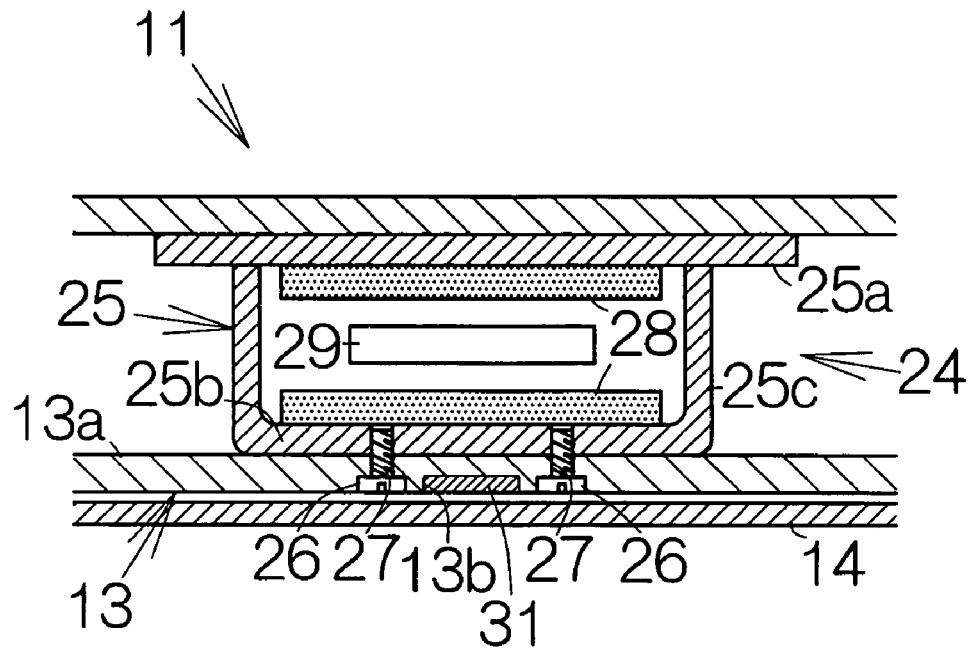
FIG. 3 is a vertical sectional view taken along the line 3-3 in FIG. 1.

As shown in FIG. 3, the voice coil motor 24 includes a yoke 25. The yoke 25 comprises an upper yoke 25a and a lower yoke 25b. The lower yoke 25b is opposed to the upper yoke 25a at a distance. A pair of side yokes 25c, 25c is formed to stand upright from the lower yoke 25b. The side yokes 25c are integral to the lower yoke 25b. The upper ends of the side yokes 25c receive the upper yoke 25a. A circulation path is established for magnetic flux through the upper yoke 25a, the lower yoke 25b and the side yokes 25c. The yoke 25 is made of a magnetic material such as iron, stainless steel, or the like.

The lower yoke 25b is fixed to the bottom plate 13a of the base 13. A pair of screws 26, 26 is employed to fix the lower yoke 25b in this manner. The screws 26, 26 penetrate through corresponding through holes 27, 27 bored in the bottom plate 13a.

The upper and lower yokes 25a, 25b cooperate to define an inside space. A pair of magnets 28, 28 is disposed within the inside space. One of the magnets 28 is fixed to the upper yoke 25a. The other of the magnets 28 is fixed to the lower yoke 25b. The magnets 28 maybe permanent magnets, for example. The magnets 28 generate magnetic flux circulating through the yoke 25.

A voice coil 29 is disposed in a space between the magnets 28. The voice coil 29 is coupled to the actuator block 19. Electric wires, not shown, are connected to the voice coil 29. Electric current is supplied to the voice coil 29 through the electric wires. The supplied electric current serves to generate magnetic flux at the voice coil 29. A gap is defined between the voice coil 29 and the magnets 28.

A magnetic body 31 is embedded in the bottom plate 13a of the base 13. The magnetic body 31 is located between the printed circuit board 14 and the voice coil motor 24. A depression or groove 13b is formed in the bottom plate 13a so as to receive the magnetic body 31. The groove 13b is formed based on a reduction in the thickness of the bottom plate 13a. Nickel iron (NiFe) alloy, a stainless steel piece, an iron piece covered with a plated metallic film such as nickel, or the like may be utilized for the magnetic body 31.

Now, assume that electric current is supplied to the voice coil 29. Magnetic flux is generated at the voice coil 29 in response to the supply of the electric current. The generated magnetic flux interacts with the magnetic flux of the magnets 28 so as to cause movement of the voice coil 29. The voice coil 29 swings around the support shaft 18. This movement of the voice coil 29 causes the swinging movement of the actuator arms 21.

The magnetic body 31 serves as a magnetic shield for the voice coil motor 24 in the hard disk drive 11. In addition, the magnetic body 31 is allowed to have a sufficient thickness without requiring an additional space outside the base 13, since the magnetic body 31 is embedded in the bottom plate 13a of the base 13. Even if the magnetic flux density is enhanced to improve the performance of the voice coil motor 24, the magnetic field directed outside the base 13 can be absorbed at the magnetic body 31. The magnetic body 31 thus serves to suppress the leakage of the magnetic field outside the base 13.

Moreover, the lower yoke 28b serves to reinforce the rigidity of the bottom plate 13a between the screws 26. Establishment of the groove 13b in the bottom plate 13a cannot lead to a reduced rigidity of the housing 12. The sufficient rigidity of the housing 12 serves to maintain accuracy in positioning the flying head slider 23.

Figure 4:
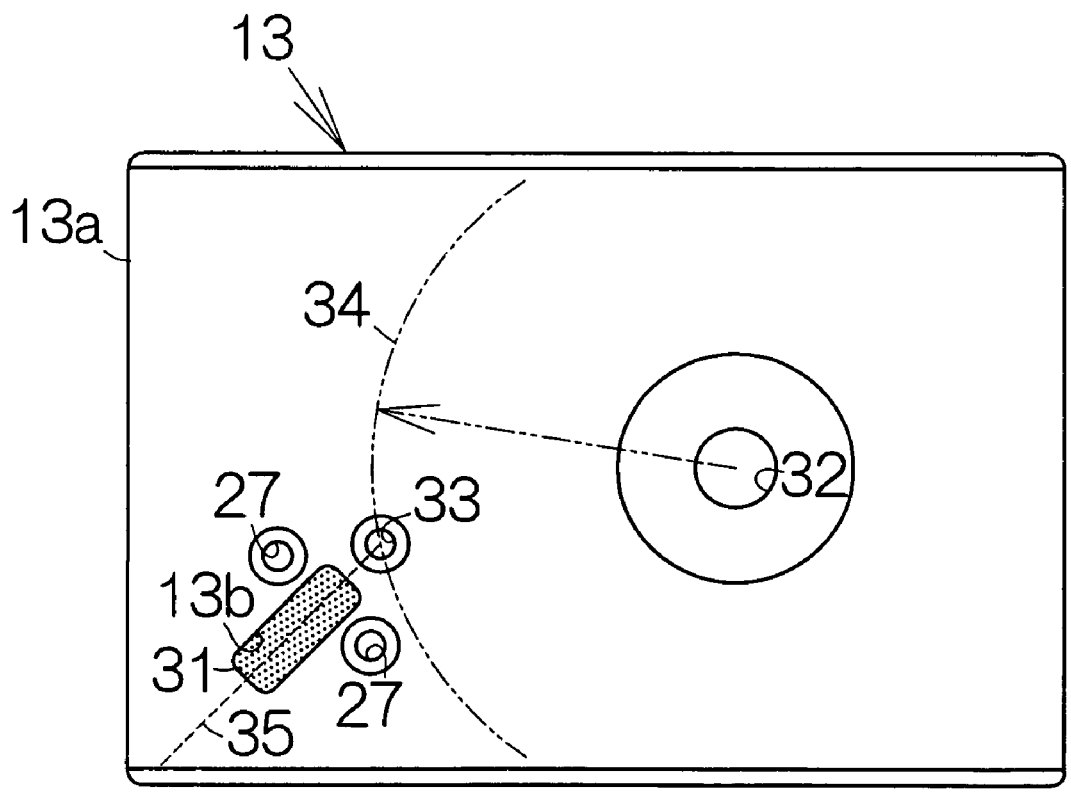
FIG. 4 is a bottom view of a base for schematically illustrating the location of a magnetic body on the bottom plate of the base.

As shown in FIG. 4, a base 13 is first prepared in the production of the hard disk drive 11. A through hole 32 is bored in the base 13 for receiving the spindle motor 16. A through hole 33 is also bored in the base 13 for receiving screws employed to fix the support shaft 18 to the base 13. Here, an imaginary circle 34 is described around the through hole 32. The imaginary circle 34 passes through the center of the through hole 33.

A reference line 35 is established on the bottom plate 13a. The reference line 35 intersects with the imaginary circle 34 at the center of the through hole 33. The reference line 35 extends from the through hole 33 in the outward direction of the imaginary circle 34. The through holes 27 are located symmetric relative to the reference line 35. The groove 13b is formed on the outer surface of the bottom plate 13a along the reference line 35. The position of the groove 13b is in this manner allowed to correspond to the position of the voice coil motor 24.

The magnetic body 31 is embedded in the groove 13b. The magnetic body 32 may be provided as a one-piece member or a fluid capable of getting solidified. The magnetic piece may be fitted within the groove 13b, for example. An adhesive may be employed to fix the magnetic piece. The outer surface of the magnetic body 31 should be flush with the outer surface of the bottom plate 13a. Otherwise, the magnetic body 31 may protrude from the outer surface of the bottom plate 13. Alternatively, the surface of the magnetic body 31 may retreat from the outer surface of the bottom plate 13a.

Figure 5:
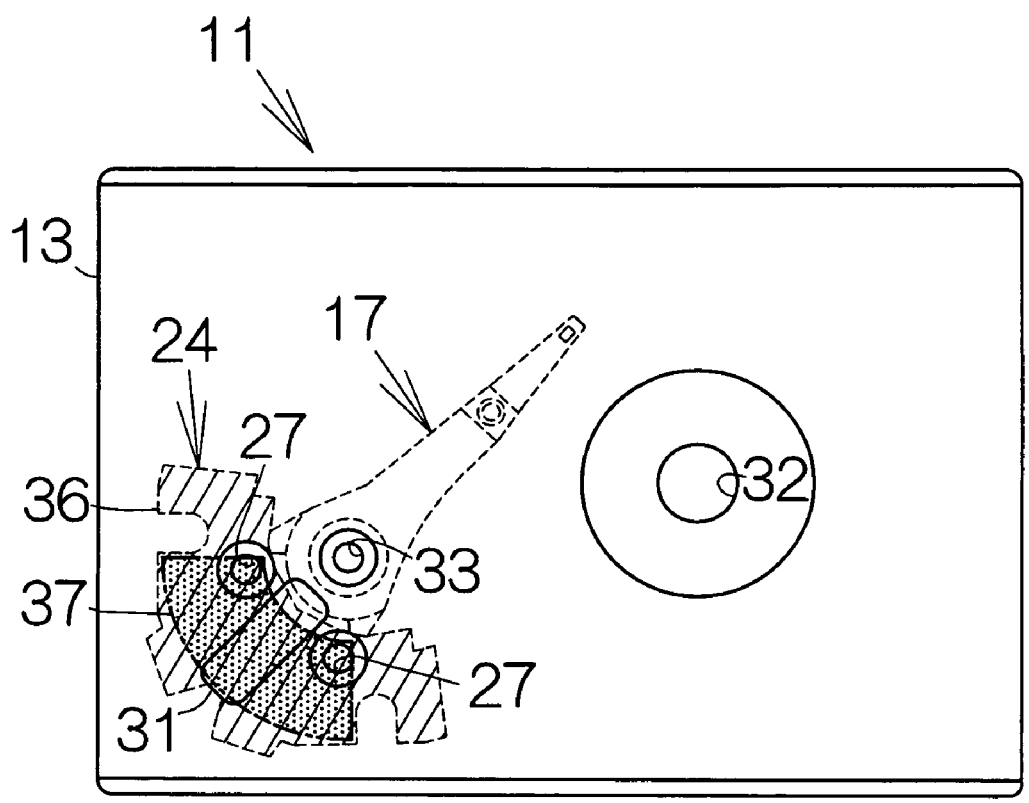
FIG. 5 is a bottom view of the base for schematically illustrating the location of the magnetic body relative to actuator arms and voice coil motor.

As shown in FIG. 5, the voice coil motor 24 and the head actuator 17 are then attached to the base 13. The spindle motor 16 and the magnetic recording disk 15 are thereafter mounted on the base 13. The magnetic body 31 can in this manner be located in a projection area 36 defined on the surface of the bottom plate 13a. The projection area 36 is contoured along the contour of the projection of the voice coil motor 24. The projection area 36 may be contoured based on the projection of the upper and lower yokes 25a, 25b, for example. The magnetic body 31 is also located within a projection area 37 contoured along the contour of the projection of the magnets 28.

Figure 6:
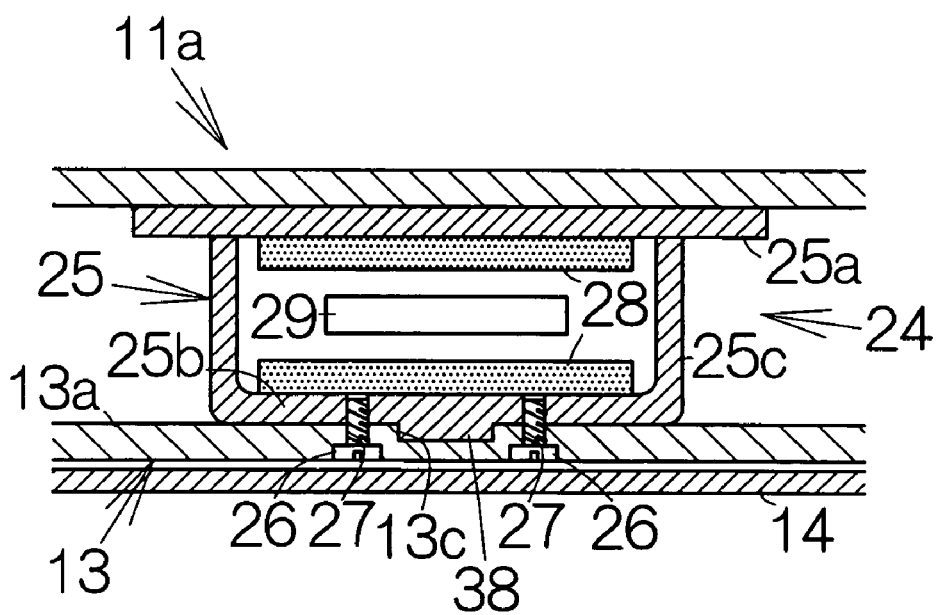
FIG. 6 is a vertical sectional view, corresponding to FIG. 2, illustrating the structure of the hard disk drive according to a second embodiment of the present invention.

FIG. 6 schematically illustrates the structure of a hard disk drive 11a as a specific example of a second embodiment of the present invention. The hard disk drive 11a allows the disposition of a magnetic protrusion 38 on the outer surface of the lower yoke 25b. The magnetic protrusion 38 protrudes from the outer surface of the lower yoke 25b. The magnetic protrusion 38 may be integral to the lower yoke 25b based on integral formation. The magnetic protrusion 38 is received in a depression or groove 13c formed on the inner surface of the bottom plate 13a. The magnetic protrusion 38 may be located in a space between the screws 26.

The lower yoke 25b is allowed to partially have a larger thickness in the hard disk drive 11a. Even if the magnetic flux density is enhanced to improve the performance of the voice coil motor 24, the magnetic field directed outside the base 13 can be absorbed at the magnetic protrusion 38. The magnetic protrusion 38 thus serves to suppress the leakage of the magnetic field outside the base 13.

Moreover, the magnetic protrusion 38 is integral to the lower yoke 25b. The magnetic protrusion 38 is inserted in the groove 13c of the base 13 so as to position the voice coil motor 24 on the base 13. Even if an impact is applied on the hard disk drive 11a, the voice coil motor 24 can be prevented from shifting along the surface of the bottom plate 13a.

Figure 7:
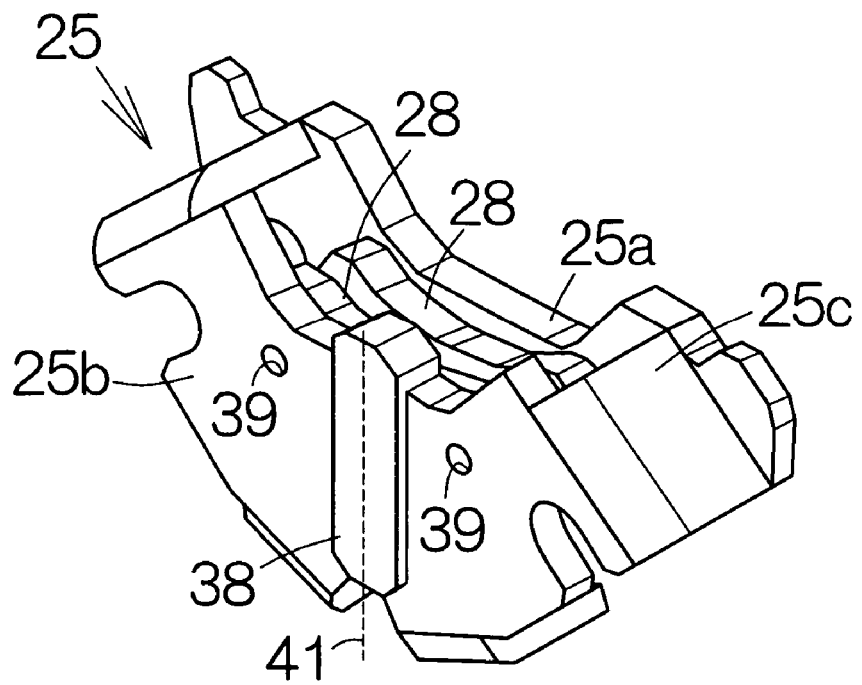
FIG. 7 is an enlarged perspective view schematically illustrating a yoke according to the second embodiment.

As shown in FIG. 7, the yoke 25 is first prepared in the production of the hard disk drive 11a. The magnets 28 are disposed in the inside space in the yoke 25. The magnetic protrusion 38 is formed on the lower yoke 25b so as to protrude from the outer surface of the lower yoke 25b as described above. A pair of threaded bores 39, 39 is formed in the lower yoke 25b. The threaded bores 39 are located symmetric relative to a reference line 41. The magnetic protrusion 38 extends along the reference line 41.

Figure 8:
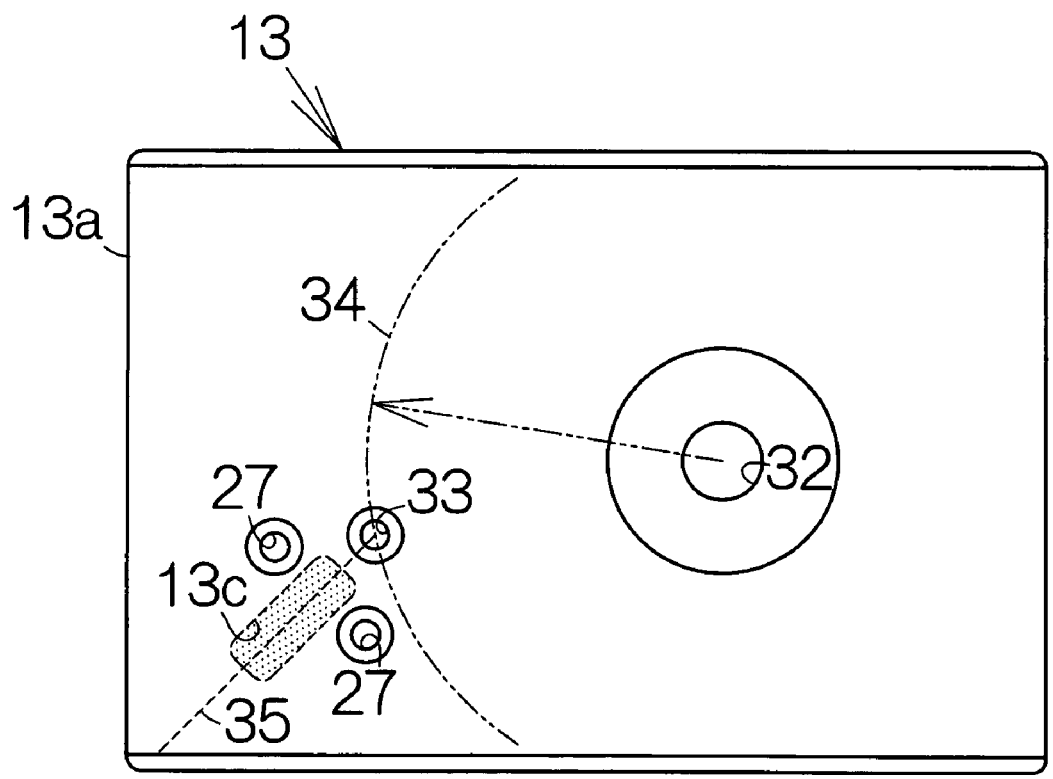
FIG. 8 is a bottom view of a base for schematically illustrating the location of a magnetic protrusion on the bottom plate of the base.
Figure 9:
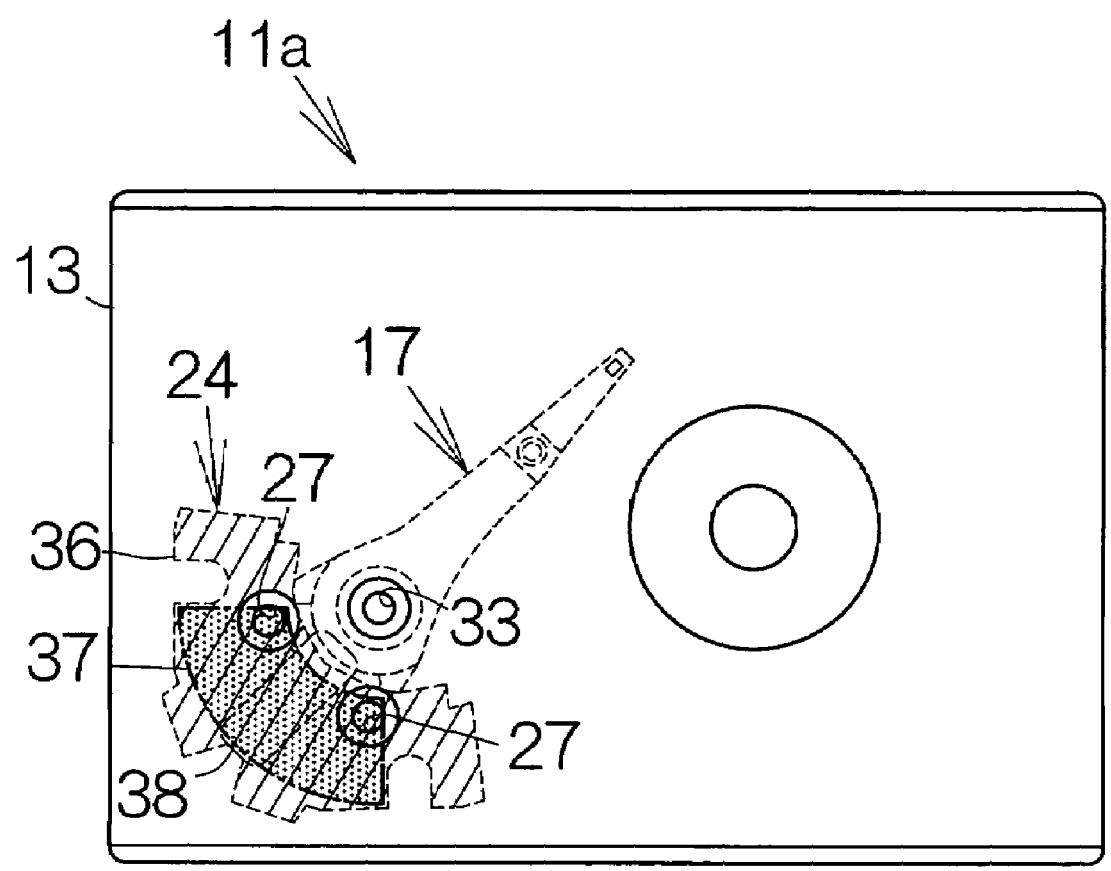
FIG. 9 is a bottom view of the base for schematically illustrating the location of the magnetic protrusion relative to actuator arms and voice coil motor.

As shown in FIG. 8, the base 13 is simultaneously prepared. The reference line 35 is established on the bottom plate 13a so as to intersect with the imaginary circle 34 described around the through hole 33 in the aforementioned manner. The groove 13c is formed on the inner surface of the bottom plate 13a along the reference line 35.

The yoke 25 is mounted on the base 13. When the magnetic protrusion 38 is received in the groove 13c, the threaded bores 39 are positioned on the through holes 27. Screws are then inserted into the through holes 27 from the outside. The screws are screwed into the threaded bores 39. The yoke 25 is in this manner fixed on the bottom plate 13a.

The head actuator 17, the spindle motor 16 and the magnetic recording disk 15 are thereafter mounted on the base 13. The magnetic protrusion 38 can in this manner be located in the projection area 36 defined on the surface of the bottom plate 13a in the same manner as described above. The projection area 36 is contoured along the contour of the projection of the voice coil motor 24. The projection area 36 may be contoured based on the projection of the upper and lower yokes 25a, 25b, for example. The magnetic protrusion 38 is also located within a projection area 37 contoured along the contour of the projection of the magnets 28.

What is claimed is:

1. A recording medium drive comprising:

a base having a bottom plate;

a cover coupled to the base, the cover defining a space in cooperation with the base;

a voice coil motor placed within the space;

a depression defined in an outside surface of the bottom plate; and a magnetic body embedded in the bottom plate, the magnetic body being received in the depression, said bottom plate separating the magnetic body from the voice coil motor, wherein said voice coil motor comprises a yoke placed on the bottom plate of the base, said yoke being coupled to the base with a pair of screws, the depression being positioned between the screws.

2. The recording medium drive according to claim 1, wherein said depression is formed based on a reduction in thickness of the bottom plate.

3. The recording medium drive according to claim 2, further comprising:

a printed circuit board attached to an outside of the base, said magnetic body being located in a space between the printed circuit board and the voice coil motor.

4. The recording medium drive according to claim 3, wherein said magnetic body is located in a projection area defined on a surface of the bottom plate, said projection area being contoured along a contour of a projection of the voice coil motor.

5. The recording medium drive according to claim 4, wherein said projection area is contoured along a contour of a projection of the yoke.

6. The recording medium drive according to claim 4, wherein said projection area is contoured along a contour of a projection of a magnet incorporated in the voice coil motor.

* * * * *